US008861656B2

(12) United States Patent
Hollevoet et al.

(10) Patent No.: US 8,861,656 B2
(45) Date of Patent: Oct. 14, 2014

(54) DIGITAL FRONT-END CIRCUIT AND METHOD FOR USING THE SAME

(75) Inventors: Lieven Hollevoet, Leuven (BE); Frederik Naessens, Leuven (BE); Praveen Raghavan, Leuven (BE); Sofie Pollin, Leuven (BE); Eduardo Lopez Estraviz, Leuven (BE)

(73) Assignee: IMEC, Leuven (BE)

( * ) Notice: Subject to any disclaimer, the term of this patent is extended or adjusted under 35 U.S.C. 154(b) by 25 days.

(21) Appl. No.: 13/563,243

(22) Filed: Jul. 31, 2012

(65) Prior Publication Data
US 2013/0022157 A1 Jan. 24, 2013

Related U.S. Application Data

(63) Continuation of application No. PCT/EP2011/051357, filed on Feb. 1, 2011.

(60) Provisional application No. 61/305,865, filed on Feb. 18, 2010.

(30) Foreign Application Priority Data

Feb. 18, 2010 (EP) .................................. 10153967

(51) Int. Cl.
*H03D 1/00* (2006.01)
*H04B 1/00* (2006.01)

(52) U.S. Cl.
CPC .................................. *H04B 1/0003* (2013.01)
USPC ........... 375/343; 375/295; 375/316; 375/340; 375/346; 375/350

(58) Field of Classification Search
USPC ......... 375/222, 259, 262, 271, 286, 295, 302, 375/316, 340, 343, 346, 347, 350
See application file for complete search history.

(56) References Cited

U.S. PATENT DOCUMENTS

| | | | | |
|---|---|---|---|---|
| 7,756,219 B2 * | 7/2010 | Beyer et al. | .................. | 375/309 |
| 8,081,722 B1 * | 12/2011 | Furman et al. | ................ | 375/350 |
| 8,299,947 B2 * | 10/2012 | Pagnanelli | .................... | 341/143 |
| 8,582,694 B2 * | 11/2013 | Velazquez et al. | ........... | 375/340 |
| 2008/0051129 A1 * | 2/2008 | Abe et al. | ................... | 455/550.1 |
| 2008/0165754 A1 | 7/2008 | Hu | | |
| 2008/0207204 A1 * | 8/2008 | Vlantis et al. | .............. | 455/435.2 |
| 2008/0279290 A1 * | 11/2008 | Radpour | ........................ | 375/260 |
| 2010/0056201 A1 * | 3/2010 | Akamine et al. | ........... | 455/552.1 |
| 2012/0140793 A1 * | 6/2012 | Demessie et al. | ............ | 375/130 |
| 2012/0236976 A1 * | 9/2012 | Smith | .......................... | 375/350 |

FOREIGN PATENT DOCUMENTS

WO  WO 2007/132016  11/2007

OTHER PUBLICATIONS

Tachiwali et al., "A Frequency Agile Implementation for IEEE 802. 22 Using Software Defined Radio Platform", Global Telecommunications Conference, 2008. IEEE Globecom 2008. IEEE, IEEE, Piscataway, NJ, USA, Nov. 30, 2008, pp. 1-6.
Bougard et al., "A Scalable Baseband Platform for Energy-Efficient Reactive Software-Defined-Radio", Cognitive Radio Oriented Wireless Networks and Communications, 2006. 1st International Conference on, IEEE, PI, Jun. 1, 2006, pp. 1-5.
Ahmad et al., "A cognitive radio approach to realize coexistence optimized wireless automation systems", Emerging Technologies & Factory Automation, 2009. ETFA 2009. IEEE Conference on, IEEE, Piscataway, NJ, USA, Sep. 22, 2009, pp. 1-8.
International Search Report for International application No. PCT/EP2011/051357 dated Feb. 28, 2011 by European Patent Office.
European Search Report for European Patent Application No. 10153967.4-1246 dated May 19, 2010 by European Patent Office.

* cited by examiner

*Primary Examiner* — Hirdepal Singh
(74) *Attorney, Agent, or Firm* — Knobbe Martens Olson & Bear LLP

(57) ABSTRACT

A digital front-end circuit is disclosed. In one aspect, the circuit includes a filtering block for filtering received data. The filtering block has a first filter branch for filtering the received data in a first frequency band and a second filter branch for filtering the received data in a selected second frequency band. The second filter branch is in parallel with the first filter branch, is programmable and includes a block for resampling the received data. The front-end circuit also includes a circuit for performing synchronization and spectrum sensing on the received data, which is in connection with the output of the filtering block. The front-end circuit also includes a controller block for controlling the filtering block and the synchronization circuit.

14 Claims, 5 Drawing Sheets

DIGITAL FRONT-END CIRCUIT AND METHOD FOR USING THE SAME

CROSS REFERENCE TO RELATED APPLICATIONS

This application is a continuation of PCT Application No. PCT/EP2011/051357, filed Feb. 1, 2011, which claims priority under 35 U.S.C. §119(e) to U.S. provisional patent application 61/305,865 filed on Feb. 18, 2010. Each of the above applications is incorporated herein by reference in its entirety.

BACKGROUND OF THE INVENTION

1. Field of the Invention

The disclosed technology generally relates to the field of digital receiver front-ends and of digital receivers including such a front-end.

2. Description of the Related Technology

Software-defined radio (SDR) is a collection of hardware and software technologies that enable reconfigurable system architectures for wireless networks and user terminals. SDR provides an efficient and comparatively inexpensive solution to the problem of building multi-mode, multi-band, multi-functional wireless devices that can be adapted, updated or enhanced by using software upgrades. As such, SDR can be considered an enabling technology that is applicable across a wide range of areas within the wireless community.

A software-defined radio platform can be seen as a step towards a cognitive radio system, a fully reconfigurable wireless black box that automatically changes its communication variables in response to network and user demands. Cognitive radio is a paradigm for wireless communication in which either a network or a wireless node changes its transmission or reception parameters to communicate efficiently avoiding interference with licensed or unlicensed users. This alteration of parameters is based on the active monitoring of several factors in the external and internal radio environment, such as radio frequency spectrum, user behavior and network state.

Handheld digital receiver cost reduction and time-to-market improvement call for software defined radio (SDR) implementation. To be viable in portable handheld devices, SDR must also be low power. A variety of constraints results from this requirement. To meet the stringent specifications algorithm/architecture co-design is crucial for emerging radio systems like SDR.

A number of promising application scenarios additionally determine performance requirements. Wireless LAN (WLAN) to cellular handover is an appealing application scenario for SDRs, since it would allow seamless and opportunistic roaming between both types of networks, in order to obtain a predetermined performance in terms of power consumption and flexibility. Huge benefits in terms of performance and energy consumption are typically expected, but a main driver is of course the price per bit that could be significantly reduced. To support the handover decision, extra information about the current and target network is needed. The IEEE 802.21 standard supports cooperative use of information at the mobile node and within the network infrastructure. This means that both the mobile node and the network can make decisions about connectivity based on measurement reports supplied by the link layer. These measurement reports can be signal qualities, network loads or packet error rates. Hence, there is a need for a digital front-end circuit able to provide some basic measurement reports, e.g. signal qualities, for e.g. WLAN and long term evolution (LTE). In addition it should be able to perform a coarse time synchronization for both standards.

In the prior art solutions for synchronization are found wherein dedicated (hard-wired) synchronization blocks are applied. Coarse grain array-type synchronization blocks are known to be not very power efficient.

Regarding sensing most of the existing experimental platforms and measurements have been based either on expensive laboratory equipment, such as vector spectrum analyzers, with high sensitivity or very low-cost narrowband, limited sensitivity off-the-shelf demonstrators. Most of the existing sensing engine implementations have followed the FCC and focused specifically on the detection of TV-signals (good examples were early FCC demonstrator systems, e.g. from Microsoft and Philips, and work by several IEEE802.22 based projects). A sensing engine, with embedded feature detection algorithms, is currently unavailable in the civilian domain. The current state-of-the-art in spectrum sensing does not address practical concerns of building scalable, reliable, low-power sensing engines that fulfill stringent requirements.

Various platforms (TI, Intel platforms, . . . ) are known that combine accelerators with processors. The control is centralized by the processor and thereby does not allow asynchronous operation between the different processes (accelerator and processor core).

For emerging standards there is a need to scale up the overall architecture to 4G requirements and need to increase both the performance and the level of programmability of the current synchronization ASIP. This includes supporting bandwidths up to 100 MHz and improved MIMO operation.

For future radio architectures: need for flexible resampling & programmable filtering. An interpolator-based approach is envisaged, leading to very flexible rate-support.

For cognitive radio sensing and multi-band reception capabilities are required which have a significant impact on the architecture: without sensing, no cognitive radio. A desired solution should enable a) sensing power in specific subbands and b) selecting a specific band, down-convert to baseband and resample. In order to allow multi-band reception, multiple 'paths' are required.

From patent application WO2007/132016 a digital receiver structure is known that enables environment awareness and gradual system wake-up in response to incoming radio transmission.

The paper "A cognitive radio approach to realize coexistence optimized wireless automation systems" (K. Ahmad et al., IEEE Conference on Emerging Technologies & Factory Automation, 22 Sep. 2009, pp. 1-8) is basically concerned with coexistence of multiple radio systems. The use of software defined radio is proposed to allow multi-mode, multi-band and multi-functional wireless radios that can be modified by software upgrades. A set-up with a master transceiver and slave transceiver is used. The described flow is completely in software. Demodulation and sensing are performed in parallel in the receive path, but the paper is not at all concerned with the power efficiency of the proposed architecture. A receive platform is shown with in parallel a spectrum analyzer. When power is detected in the 2.4 GHz band, the transmitter is switched to another band.

Summary of Certain Inventive Aspects

Certain inventive aspects relate to a reconfigurable digital front-end circuit arranged for performing synchronization and spectrum sensing of various standards in a power-efficient way, and a method for simultaneously performing synchronization and spectrum sensing on received data.

In a first aspect there is a digital front-end circuit comprising a filtering block for filtering received data, wherein the filtering block comprises a first filter branch for filtering the received data in a first frequency band and a second filter branch for filtering the received data in a selected second frequency band different from the first frequency band, wherein the second filter branch, in parallel with the first filter branch, is programmable and comprises resampling block for resampling the received data. The front-end circuit further comprises a circuit for performing synchronization and spectrum sensing on the received data, wherein this circuit is in connection with the output of the filtering block, the synchronization circuit comprising: correlator block for correlating data output by the filtering block, a block for vectorizing the data output by the correlator block or further data output by the filtering block, and a processor block connected to the block for vectorizing data and comprising a scalar portion and a vector portion. The scalar portion is arranged for exchanging control instructions with the block for vectorizing data and with the vector portion. The vector portion is arranged for processing the vectorized data. The processor block is further arranged for detecting signal presence in the selected second frequency band. The front-end circuit further comprises a controller block for controlling the filtering block and the circuit for performing synchronization and spectrum sensing.

The above digital front-end circuit indeed meets the requirements set for such circuit. The first filter branch is a low-power filter branch that is limited in functionality: it performs a preset filtering operation. This branch is also strongly optimized in area. It can be used for filtering a band with centre frequency and bandwidth as supported by the reconfigurable analogue front end. The second filter branch, in parallel with the first filter branch, is for filtering the received data in a selected second frequency band, which is different from the first frequency band. The second filter branch is programmable so that a frequency band can be selected for filtering. This is a useful feature for performing spectrum sensing. Apart from band selection and downconversion to bring the received signal to baseband, the flexible second frequency branch also supports non-integer fraction resampling.

The setup according to one inventive aspect allows simultaneous sensing/reception of a wide band and a narrow band, i.e. using the first and the second filter branch in parallel. Another essential element to achieve this goal is the circuit for performing synchronization and spectrum sensing on the received data. This circuit is in connection with the output of the filtering block. The circuit comprises a correlator for correlating the data input from the filtering block. The correlation is an essential step in the synchronization. Data output by the correlator are vectorized, i.e. serial-to-parallel converted. When no correlation-specific synchronization action is to be performed the correlator can be put in a pass-through mode. In this case the data received from the filtering block is immediately vectorized without performing any correlation. The vectorized data is applied to a processor. The processor comprises a scalar slot for exchanging control instructions with the vectorization block and instructions to determine the control flow of the processor. The vector portion of the processor takes care of processing the vectorized data. The processor is also capable of detecting signal presence in the frequency band selected in the second branch. Finally, a controller block is provided for controlling the filtering block and the circuit for performing synchronization and spectrum sensing.

In a preferred embodiment the digital front-end circuit comprises rotation accelerator block for allowing in the sensing algorithms operations requiring rotation of vectorized data. This leads to improved sensing.

Preferably the digital front-end circuit also comprises an FFT accelerator for detecting signal presence. The FFT block is used for detecting power in frequency bins of the received signal. This functionality is advantageously used in certain sensing algorithms.

In one aspect the digital front-end further comprises compensation block for compensating impaired received data. Impairments to be compensated can for example be a DC offset and/or an I/Q imbalance.

In one aspect the digital front-end receiver comprises a receive buffer. In this buffer data to be output can be stored before the data is sent over the host data interface.

In one aspect the processor block is provided with a clock arranged for operation at the speed of the received data, optionally after resampling. The vector portion of the processor enables performing a computation on multiple samples in a single clock cycle. The vector slot width is determined so that all required operations for synchronization and/or sensing can be performed on a vector before a new vector is available. The vector slot allows clocking the processor at the incoming sample speed. This way, use of a PLL and a higher clock frequency is avoided, which yields an important advantage in terms of power consumption.

In another aspect the processor block comprises detection block for detecting signal presence in the selected second frequency band.

Another inventive aspect relates to a digital front-end structure comprising a digital front-end receiver circuit as previously described and at least one further digital front-end receiver circuit. The at least one further digital front-end circuit comprises a) further filtering block comprising a third filter branch for filtering the received data either in the first frequency band or in a third frequency band different from the first frequency band, b) a further circuit for performing synchronization and spectrum sensing, whereby the further circuit is in connection with the output of the further filtering block, the circuit comprising further correlator block for correlating data output by the further filtering block and further processing block, and c) a further controller block for controlling the further filtering block and the further circuit for performing synchronization and spectrum sensing.

The digital front-end structure comprises at least two 'tiles', namely one with the front-end circuit as previously described and at least one further front-end circuit of less complexity. One complexity reduction may be due to the presence of only one filter branch, similar to (of the same kind as) the first filter branch in the filtering block of the circuit as described above. Also the further correlator block and/or the further processor block can be reduced in complexity as compared to their counterparts in the front-end circuit of the first tile (as described above). The further front-end circuit is arranged for performing synchronization only.

However, in one embodiment of the digital front-end structure the further filtering block comprises a fourth filter branch in parallel with the third filter branch and being programmable. In this way also the sensing functionality can be provided in the at least one further tile. The fourth filter branch can filter a selected fourth frequency band for sensing.

In one aspect there is a digital receiver comprising a digital front-end circuit or a digital front-end structure as previously described. In an advantageous embodiment the digital receiver further comprises a reconfigurable analogue front-end circuit.

In another aspect there is a method for simultaneously performing synchronization and spectrum sensing on data received in a digital front-end circuit, comprising: a) filtering the received data in a first frequency band via a first filter branch and filtering the received data in a selected second frequency band via a second filter branch in parallel with the first filter branch, whereby the second frequency band is different from the first frequency band, b) performing a synchronization operation on the received data filtered in the first frequency band with a circuit for performing synchronization and spectrum sensing comprised in the digital front-end circuit, c) sending synchronized data to a data output of the digital front end circuit, d) performing a sensing operation on the received data filtered in the selected second frequency band with the circuit for performing synchronization and spectrum sensing comprised in the digital front-end circuit, and e) outputting information related to the sensed data.

DETAILED DESCRIPTION OF CERTAIN ILLUSTRATIVE EMBODIMENTS

Certain embodiments relate in a first aspect to a digital front-end circuit capable of receiving and sensing data encoded according to one of a variety of possible wireless communication standards in a power efficient way.

The digital front-end circuit in one embodiment constitutes an interface between the analogue front-end and the baseband (front-end data and control interfaces). Separately, independent units can be foreseen corresponding to the different antenna paths. These units are also referred to as tiles. Each unit can be configured and used independently or in a collaborative way (e.g., for multi-antenna transmission or reception). In particular, for the receive path, an important function is to enable very low power operation of the software defined radio platform through a gradual wakeup of the platform.

Further, the digital front-end circuit is arranged for performing the signal acquisition and coarse time synchronization on incoming bursts for the different standards in scope. WLAN and LTE are considered as main standards for driving the specifications of the digital front-end circuit according to one embodiment. The proposed solution allows reliable synchronization on various standards (e.g., WLAN, LTE) and supports spectrum sensing (e.g., WLAN, LTE, DVB-T). For broadcasting standards, it is assumed the most efficient approach to run the synchronization on the baseband processor, which has to be started up anyway in this case as the data streams are continuous.

The circuit in one embodiment is equipped for performing flexible resampling and band selection. An interpolator-based approach is envisaged, leading to very flexible rate-support for both integer and fractional rate conversion.

The digital front-end circuit is capable of performing spectrum sensing to improve coexistence and handover and allow the use of white spaces (i.e. unused spectrum). Specifically, support is added for:

scanning multiple bands in parallel to detect presence of networks in neighboring channels, frequency bands or cells. (Multiband) Energy detection algorithms allow detection of any network in such neighboring channel, frequency band or cell, while feature detection algorithms can find specific networks.

white-space spectrum sensing through advanced sensing algorithms that can detect presence of primary networks that need to be protected from almost all harmful interference. This requires sensing at very low signal power levels. In this case, energy detection algorithms need to be equipped with good noise floor estimation approaches, in order to avoid confusing noise with low power signals. Feature detection algorithms are less sensitive to the noise level estimation.

Figure 1:
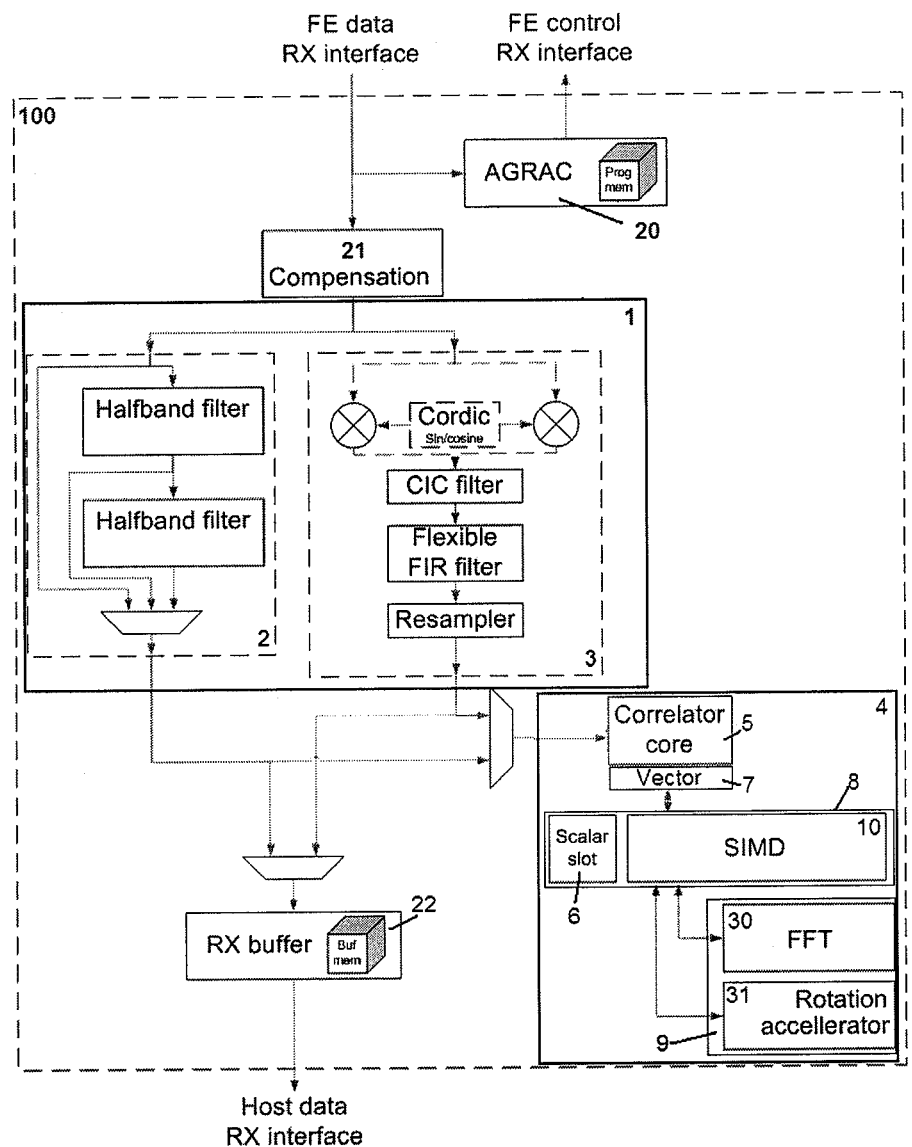
FIG. 1 illustrates a block scheme of an embodiment of the digital front-end circuit according to one embodiment.

FIG. 1 represents a high-level overview of a circuit architecture according to an embodiment. Following the data path from input to host interface the circuit (100) contains the following blocks:

a controller (AGRAC) (20) that takes care of the front-end settings and subblock activation (i.e. enabling/disabling of the subblocks)

a filtering block (1) split up in two distinct filter branches: a fixed filter branch (2) for low-power data reception and a flexible filter branch (3) including a mixer for band selection and, preferably, a resampler for rate adaptation. Both filter branches also enable simultaneous reception and sensing.

a synchronization and sensing engine (4).

Optionally, the circuit further comprises a compensation block (21) and a receive buffer (22). Below each of the blocks is discussed more in detail.

The AGC and resource activity controller (AGRAC) (20) can be implemented as a power-optimized microcontroller core that takes care of automatic gain control (AGC) and that controls the activation of other parts of the DIFFS. This block is basically the main controller of digital front-end circuit (100) and runs at the incoming sample speed. The AGRAC controller is always 'listening' for incoming signal power, while all the other modules are 'sleeping'. If an incoming data packet is detected the other modules are started as required.

As already mentioned the filtering means (1) comprises a flexible branch (3) with programmable features and a second branch (2) which is strongly power-optimized and (consequently) much less flexible or even fixed and limited in functionality. The flexible filter branch supports band selection and resampling and allows for reception and sensing of any subband of the received signal band. The flexible filter chain allows coupling advanced receiver front-ends. The second filter branch can be used for reception and sensing of a band with centre frequency and bandwidth as supported by the reconfigurable analogue front-end. The filtering means allows for simultaneous sensing/reception of a wide-band and a narrowband, i.e., using the fixed and flexible filter branches in parallel.

The fixed downsample and filter branch (2) contains power-optimized fixed filters/downsamplers that allow low-pass filtering and downsampling, e.g. by factor 2 or 4. The fixed filter branch is preferably used in combination with a reconfigurable analogue front-end to allow low-power reception of the supported standards. The requirements for those filters depend on the standard to be implemented. As an example, the adjacent channel suppression can be set to 50 dB. Suppression of the 3$^{rd}$ adjacent channel is taken care of by the analogue anti-aliasing filters before the ADC in the reconfigurable analogue front-end.

The flexible filter branch (3) allows reception and processing (band selection) of very wideband signals, as generated e.g. by a bandpass sigma/delta ADC. Also, the functionality of this block enables various sensing strategies to be implemented. Additionally, this filter branch enables coupling the digital front-end to front-ends that provide oversampling rates that are not 2 or 4. For this, the flexible filter branch is equipped with a resampler enabling non-integer downsampling of the received samples. This resampler can e.g. be a Lagrange type resampler. In the embodiment shown in FIG. 1 the flexible filter branch comprises a mixer, a cascaded integrator-comb (CIC) filter, a finite impulse response (FIR) filter and resampler. The filters are programmable to provide maximum flexibility.

The synchronization and sensing engine is a circuit (4) for performing coarse time synchronization and advanced spectrum sensing algorithms on the received data. The circuit comprises a correlator core (5) to correlate data of the serial stream output by the filter section (1). The correlator core offloads the relatively simple, but computationally complex, correlation operations from the processing means (8). The output data of the correlator is fed to a vectorizer (7) that transforms the data into vector data. Also power measurement functionality can be provided. The correlator can operate in several modes. Auto- or crosscorrelation operations can be applied. In one mode it just acts as a pass-through. In this case the received data are directly applied to the vectorization means. Additionally the resampler can calculate the power of the received samples.

Figure 2:
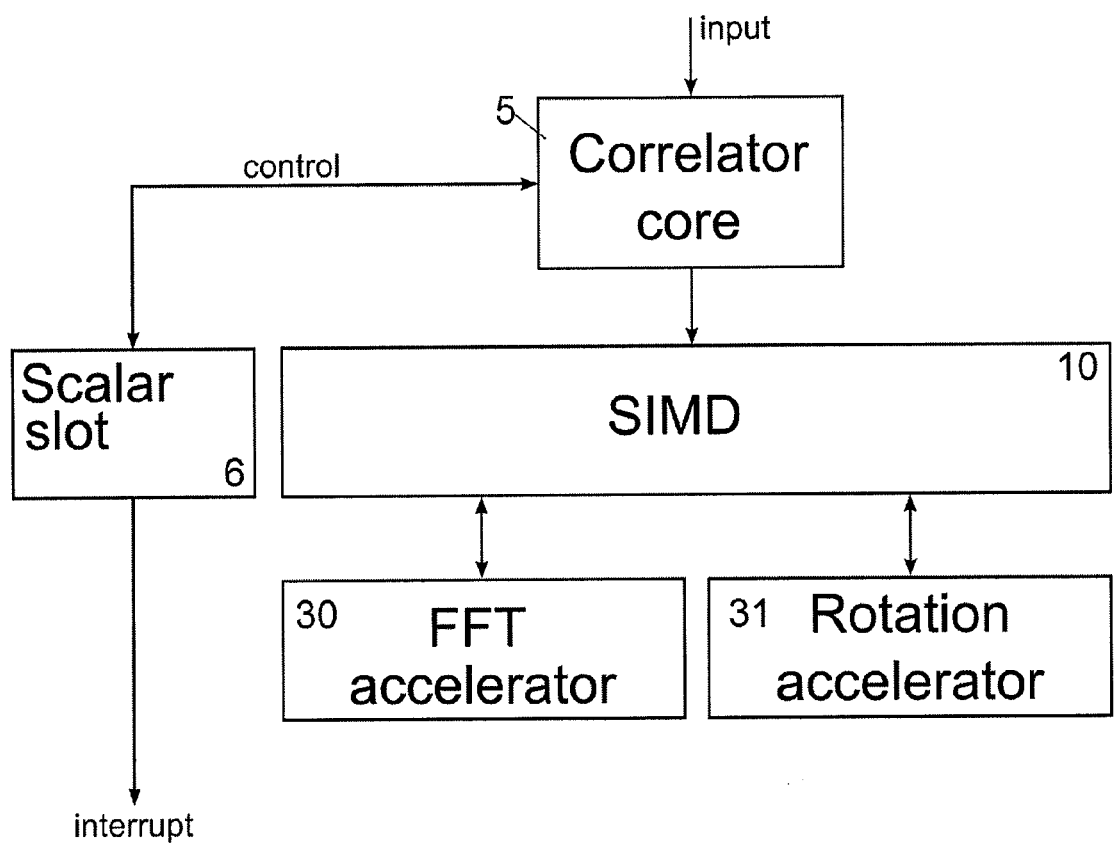
FIG. 2 represents an embodiment of the synchronization and sensing engine comprised in the digital front-end circuit.

An essential part of the circuit is the processor (8), which can e.g. be a single instruction multiple data (SIMD) processor. The processor also contains a scalar cluster (6) used for control/branch instructions and a vector cluster (10) (in FIG. 2 a 32-slot vector cluster) for number crunching. The vector cluster is fed with the vectorized data from the vectorization means.

The scalar slot (6) supports instructions required to take decisions based on the results of the SIMD. This includes branch instructions (goto, call, return, bneg, bnz), arithmetic instructions (add, sub, . . . ), logic instructions (and, or, xor, . . . ) and instructions to extract results from the scalar slot (rgrep, rmax, . . . ). No additional data memory is provided for the scalar slot, as no data-intensive algorithms are mapped to this slot. To cover cases where lookup tables would need to be implemented, a special instruction is added to the instruction set that allows mapping lookup tables to functions in program memory (return with immediate value in specific register).

The vector slot (10) supports all standard arithmetic operations on complex operands (add, sub, mul), logic operations (and, or, xor, . . . ), possibly some masking-specific instructions and finally instructions required to interface with the hardware accelerator cores. Furthermore, the SIMD data path contains logic for saturation, to avoid problems with overflow. This slot has a limited number (e.g. 8) of vector registers (limited, because they are very costly for the hardware implementation) and some data memory for storing intermediate results, FFT windows and vector masks.

Optionally, additional accelerator cores can be provided: a full FFT core (30) and a vector rotator (31). An architecture with parallel accelerator cores and a vector processor is advantageous because it enables both synchronization and sensing to be mapped on a solution that reuses the common logic for both synchronization and sensing. Next to that, the vector slot allows clocking the processor at the incoming sample speed. This way, using a PLL and a higher clock frequency (important for power consumption) is avoided. A handshake mechanism is available between the accelerators and the processor. However, it is in software which enables flexible synchronization between the accelerators and the processor. The state of each of the different components (accelerator and processor) is maintained separately by each of these components to enable an asynchronous behavior as well.

The FFT accelerator core enables the synchronization and sensing engine to perform spectral analysis of the input samples. In one possible implementation the base size of the FFT unit is 128 samples. Both smaller and bigger FFT sizes can be supported. Bigger FFT sizes are implemented through the decimation in time algorithm. This means there is a limit to the FFT size that can be run in real time. Smaller FFT sizes supported by this accelerator core are 16 and 64 samples.

Some sensing algorithms require operations implementing rotations of vectors. This functionality is mapped on a vector rotation accelerator, which accepts two vectors and supports full-flexible shift/rotations on that data.

Input samples are fed into the auto/cross correlation unit. They can originate from either of the outputs of the various filter branches present in the digital front-end circuit. This auto/cross correlation unit produces one new complex output sample every clock cycle. These samples are parallelized into a vector of 32 complex samples. The SIMD is notified when a new input vector is available. The SIMD supports the usual arithmetic operations on the input samples (add, subtract, multiply, thresholding) and prepares the data for the FFT accelerator core. This includes applying a window to the input samples of the FFT. Once the FFT result is available, it is fed back into the SIMD, where it can be processed (threshold, combination of results for bigger FFT sizes). When processing is done, the sync/sense engine will communicate the result through the host control interface. Specific instructions for the SIMD slot may be added.

Figure 3:
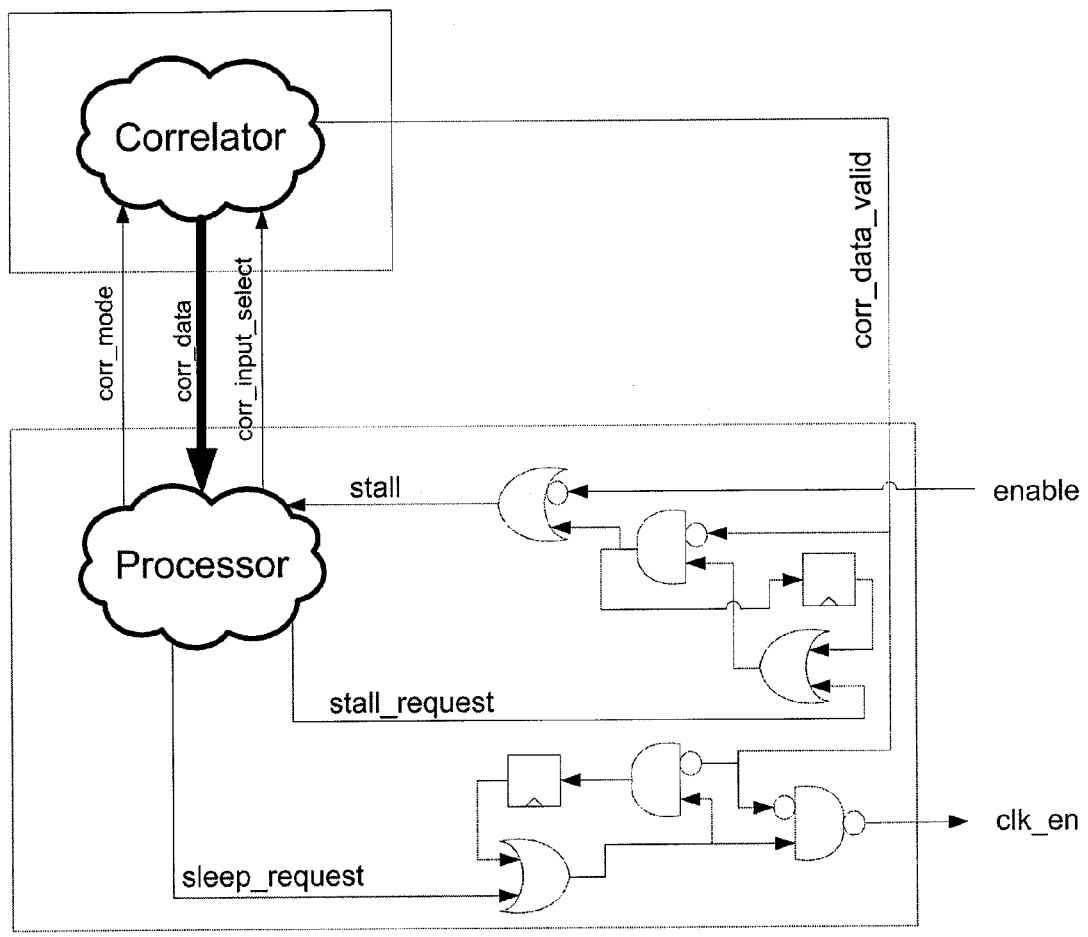
FIG. 3 illustrates the interaction between correlator and processor.

For even finer-grain power management, the processor core can put itself to sleep when the computation on the incoming data is done and when new data has not arrived yet. This is shown in FIG. 3. When done, stall_request is asserted and the processor will be stalled until new data is available from the correlator. Furthermore various optimizations have been applied to the data path of the processor. The selected algorithms for sensing advanced wireless standards typically contain arithmetical operations applied to the received signal power, or on the signal power in certain frequency bins of the received signal. The sync/sense engine is built as a SIMD with a complex data path. This SIMD has been constrained to 32 complex 12-bit slots because of the implications of the data path width on chip area and power consumption. However, as a big part of the processing is done on vectors containing real values, and since the vector width is typically >32, a very dedicated yet flexible instruction set is designed. One specific instruction is dedicated towards accumulation of real values. As the imaginary part of the values to be accumulated is zero, the processor is allowed to accumulate 24-bit values using both the 12-bit real and 12-bit imaginary sections of the data path. Another instruction supports what is called the 'double-real data path'. This means that the result of the 24-bit accumulation is quantized back to 12-bit values, and again since there is no imaginary part, both the real and the imaginary part of the data path are used to store real values. This means that in a single instruction, the SIMD slot can process either 32 complex samples, or 64 real samples when using the double real data path. This feature brings a more efficient use of the hardware, and hence again results in a reduction of the power consumption.

Advantageously the digital front-end circuit in one embodiment comprises one or more receive buffers (22). The receive buffers are implemented as asynchronous FIFOs. They both buffer the data before it is sent over the host data interface and take care of the clock domain conversion between the front-end clock and the host clock.

In one embodiment the received data are applied to a circuit for compensating for impairments that the received data may have undergone. These compensation block (21) are provided before the received data enter the filter block. Impairments that can be compensated for comprise a DC offset, I/Q imbalance, . . . . An estimation of the DC offset can be performed in the controller block. The I/Q imbalance has to be programmed. Compensating the I/Q imbalance is required for proper functioning of the sensing algorithms.

In one embodiment the digital front-end circuit is implemented as a stand-alone chip with a set of suitable interfaces. External interfaces are advantageously provided for example for a front-end interface and a host interface.

The front-end interface comprises a clock input, a data receive interface (I/Q inputs) and a front-end control interface (for passing AGC settings). The front-end interface is clocked at the clock provided by the front-end.

The host interface is somewhat more complex, as it contains the combination of a data interface, a control interface and various single-bit control signals required for low-latency interaction with the host system.

The data interface is a straightforward FIFO interface.

The control interface is a data/address bus, and is used for programming the various program memories of the core of the digital front-end circuit in one embodiment, for setting working parameters of specific subblocks of the digital front-end circuit (e.g. filters, AGC settings), and for communication of the results of computations performed by the sync/sense engine of the digital front-end circuit.

Furthermore, there are some specific single-bit control outputs. Those signals are useful to be able to notify the host of:
sync detected (interrupt output)
sync found for MIMO stream, parameters ready for reading (MIMO interrupt output)
new output produced by the sense engine (sense_output_valid).

A specific MIMO interrupt signal is implemented because the handling of MIMO functionality is relayed to the host.

When a MIMO stream needs to be received, the host will put two 'tiles' of the digital front-end structure (cfr. infra) in receive mode. As soon as one tile detects synchronization, that tile will assert the MIMO interrupt signal, thereby signaling the host that it has stored the synchronization offset pointer in the receive buffer at a specific address in the host control address map.

The host then reads that value and transfers it to the other front-end structure tile. That value is then used to synchronize the data readout of both tiles.

Figure 4:
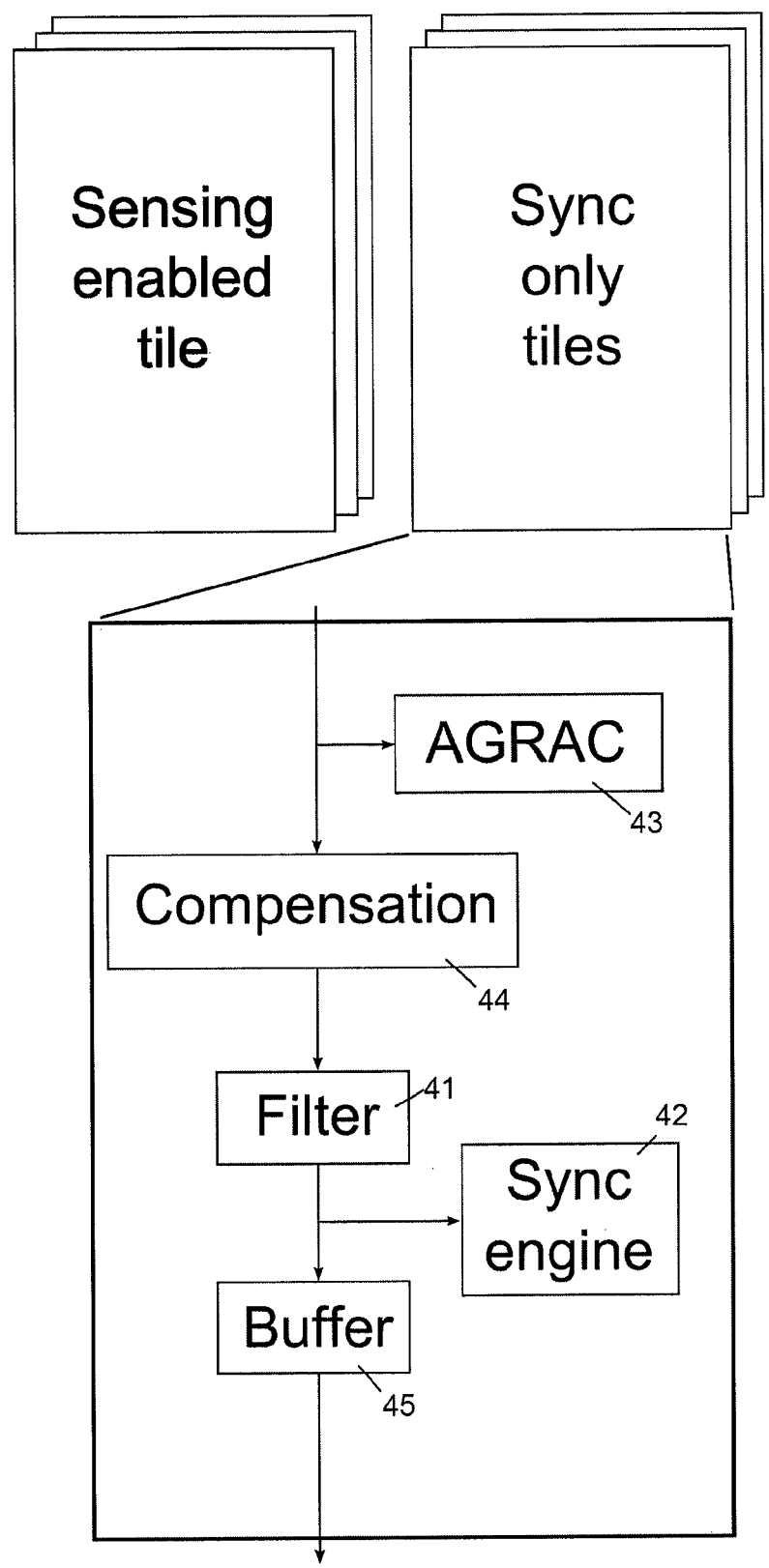
FIG. 4 illustrates an embodiment of a digital front-end structure comprising a digital front-end circuit as in FIGS. 1 and 2, and a number of tiles with only 'sync' functionality.

The digital front-end circuit as described above is in one embodiment part of a digital front-end structure that comprises at least one further digital front-end circuit. This is illustrated in FIG. 4. The one or more further digital front-end circuits are independent units (so called 'tiles') corresponding to the different antenna paths. The at least one further digital front-end circuit comprises further filtering block (41) having a third filter branch for filtering the received data either in the first frequency band (used in the digital front-end circuit as previously described), in which case there is multiple input multiple output (MIMO) reception, or in a third frequency band different from the first frequency band, in which case a signal according to another standard can be handled. The further digital front-end circuit also contains a further circuit (42) for performing synchronization and spectrum sensing, whereby the further circuit is in connection with the output of the further filtering block, the circuit comprising further correlator block for correlating data output by the further filtering block and further processing block. Also a further controller block (43) for controlling the further filtering block and the further circuit for performing synchronization and spectrum sensing is provided. The further circuit is hence of less complexity. This may be due to the presence of only one filter branch, similar to the first filter branch in the filtering block of the digital front-end circuit as earlier described. Also the further correlator block and/or the further processor block can be reduced in complexity as compared to their counterparts in the front-end circuit of the first tile. The further front-end circuit is arranged for performing synchronization only. This results in a digital front-end structure wherein only one tile performs both sensing and synchronization and wherein one or more other tiles are provided for performing synchronization only. Due to the separate filter branches it is possible to handle several frequency bands simultaneously. In the embodiment shown in FIG. 4 also compensation block (44) and a receive buffer (45) are shown.

However, in an embodiment of the digital front-end structure the further filtering block comprises a fourth filter branch in parallel with the third filter branch and being programmable, so that also the sensing functionality is provided in the further tile. The fourth filter branch can filter a selected fourth frequency band for sensing.

The digital front-end circuit in one embodiment offers various benefits. It allows power-efficient synchronization and reception of multiple wireless standards. It supports multiple reconfigurable analogue front-end types and advanced sensing algorithms to be able to take advantage of unused spectrum. Further it takes advantage of combined sensing and reception to improve the performance and power-consumption and to support handover. The circuit is also built on a future-proof architecture that can support a wide variety of standards (WLAN, LTE, DVB, . . . ). The support comes from a double filter data path, one fixed and low power for reception, one flexible for sensing. Both filter branches feed data into a single sync/sense processor that can perform sync and sensing concurrently. Various power savings are embedded in the architecture, both in the chip top level, as in the processor itself.

Figure 5:
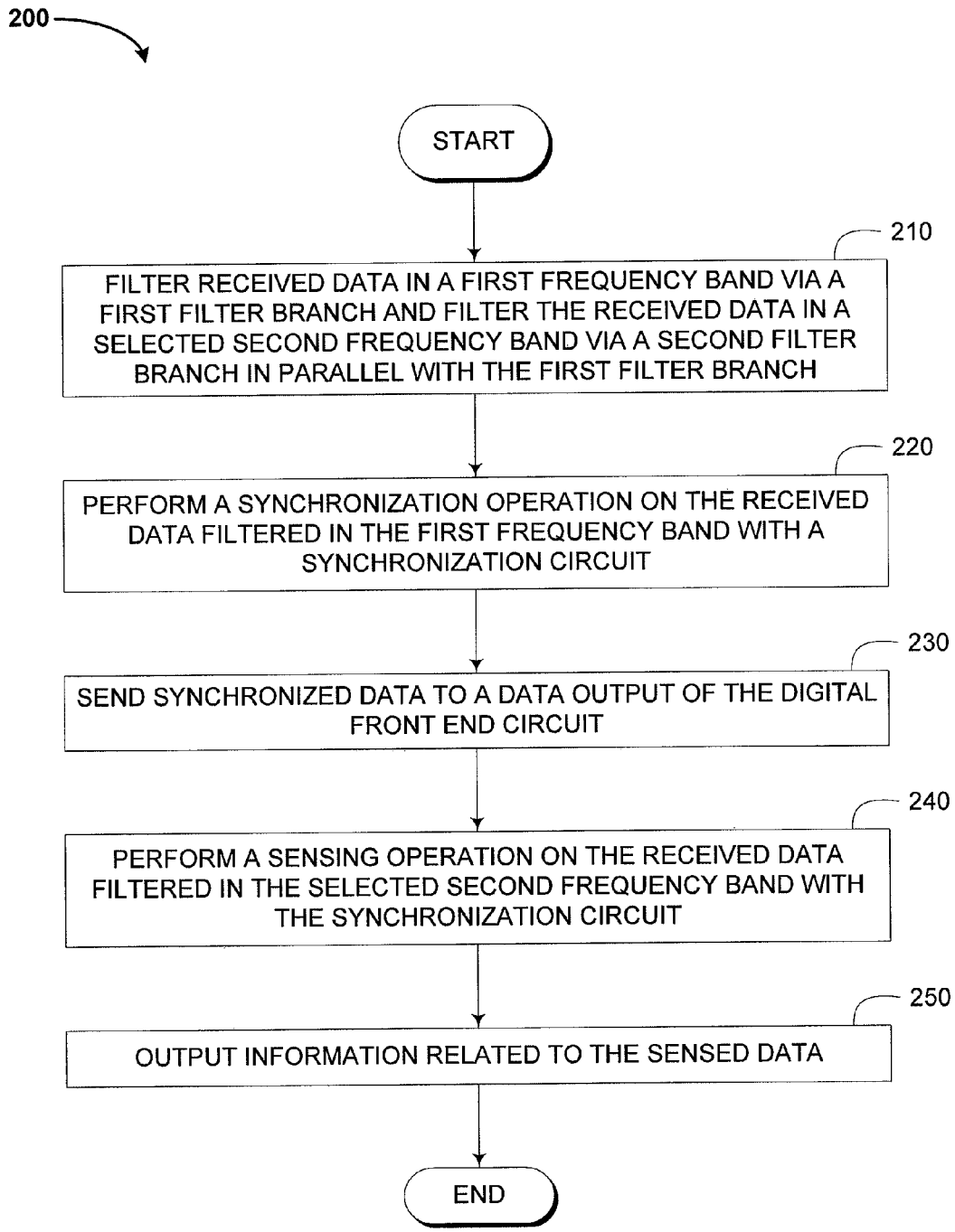
FIG. 5 shows a flowchart of one embodiment of a method of simultaneously performing synchronization and spectrum sensing on data received in a digital front-end circuit.

FIG. 5 shows a flowchart of one embodiment of a method of simultaneously performing synchronization and spectrum sensing on data received in a digital front-end circuit. The method 200 may include, at block 210, filtering the received data in a first frequency band via a first filter branch and filtering the received data in a selected second frequency band via a second filter branch in parallel with the first filter branch, the second frequency band being different from the first frequency band. Moving to block 220, the method may further include performing a synchronization operation on the received data filtered in the first frequency band with a synchronization circuit, the circuit being a part of the digital front-end circuit and configured to perform synchronization and spectrum sensing. Next at block 230, the method may further include sending synchronized data to a data output of the digital front end circuit. Moving to block 240, the method may further include performing a sensing operation on the received data filtered in the selected second frequency band with the synchronization circuit. Next at block 250, the method may further include outputting information related to the sensed data.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. Furthermore, aspects of the invention can be implemented in a computer program product stored in a computer-readable medium for execution by a programmable processor. Method steps of aspects of the invention may be performed by a programmable processor executing instructions to perform functions of those aspects of the invention, e.g., by operating on input data and generating output data. Accordingly, the embodiment includes a computer program product which provides the functionality of any of the methods described above when executed on a computing device. Further, the embodiment includes a data carrier such as for example a CD-ROM or a diskette which stores the computer product in a machine-readable form and which executes at least one of the methods described above when executed on a computing device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

What is claimed is:

1. A digital front-end circuit comprising:
    a filtering block configured to filter received data, the filtering block comprising a first filter branch for filtering the received data in a first frequency band and a second filter branch for filtering the received data in a selected second frequency band, the second frequency band being different from the first frequency band, the second filter branch being in parallel with the first filter branch, the second filter branch being programmable and comprising a resampling block for resampling the received data,
    a synchronization circuit configured to perform synchronization and spectrum sensing on the received data, the circuit being in connection with the output of the filtering block; and
    a controller block configured to control the filtering block and the synchronization circuit,
    wherein the synchronization circuit further comprises:
        a correlator block configured to correlate data output by the filtering block,
        a vectorizing block configured to vectorize the data output by the correlator block or data output by the filtering block, and
        a processor block connected to the vectorizing block, the processor block comprising a scalar portion and a vector portion, the scalar portion configured to exchange control instructions with vectorizing block and the vector portion, the vector portion being configured to process the vectorized data, the processor block further being configured to detect signal presence in the selected second frequency band.

2. The digital front-end circuit as in claim 1, comprising a rotation accelerator block for improved sensing.

3. The digital front-end circuit as in claim 1, further comprising an FFT accelerator configured to detect signal presence.

4. The digital front-end circuit as in claim 1, further comprising a compensation block configured to compensate impaired received data.

5. The digital front-end circuit as in claim 4, wherein the compensation block is configured to compensate DC offset and/or I/Q imbalance.

6. The digital front-end circuit as in claim 1, further comprising a receive buffer.

7. The digital front-end circuit as in claim 1, wherein the processor block comprises a clock arranged for operation at the speed of the received data.

8. The digital front-end circuit as in claim 1, wherein the processor block comprises a detection block configured to detect the signal presence in the selected second frequency band.

9. A digital receiver comprising a digital front-end circuit as in claim 1.

10. A digital receiver as in claim 9, further comprising a reconfigurable analogue front-end circuit.

11. A digital front-end structure comprising a digital front-end circuit as in claim 1, and at least one further digital front-end circuit, the at least one further digital front-end circuit comprising:
    a further filtering block comprising a third filter branch for filtering the received data in the first frequency band or in a third frequency band different from the first frequency band;
    a further synchronization circuit configured to perform synchronization and spectrum sensing, the further synchronization circuit being in connection with the output of the further filtering block, the further synchronization circuit comprising a further processing block and a further correlator block configured to correlate data output by the further filtering block; and a further controller block configured to control the further filtering block and the further synchronization circuit.

12. The digital front-end structure as in claim 11, wherein the further filtering block comprises a programmable fourth filter branch in parallel with the third filter branch.

13. A digital receiver comprising a digital front-end structure as in claim 11.

14. A digital receiver as in claim 13, further comprising a reconfigurable analogue front-end circuit.

* * * * *